United States Patent Office 3,793,243
Patented Feb. 19, 1974

3,793,243
STORABLE WATER-CLEAR BRIGHT-DRYING
EMULSIONS CONTAINING WAXES
Ludwig Endros, Affing, Otto Malitschek, Augsburg, and
Werner Strassberger, Gersthofen, Germany, assignors
to Farbwerke Hoechst Aktiengesellschaft vormals
Meister Lucius & Bruning, Frankfurt am Main, Germany
No Drawing. Filed June 23, 1971, Ser. No. 156,048
Claims priority, application Germany, June 26, 1970,
P 20 31 669.2
Int. Cl. C08f 45/24, 45/52
U.S. Cl. 260—28.5 R                     5 Claims

ABSTRACT OF THE DISCLOSURE

A water-clear, storable aqueous bright-drying emulsion, which consists of a wax emulsion and a water-clear polymer dispersion, as well as of, optionally, further additives, is obtained by using a wax emulsion which is an aqueous emulsion of a waxlike ester of an aliphatic monocarboxylic acid and a polyethylene glycol having a determined molar weight. The bright-drying emulsion is suitable above all for the care of floor coverings.

---

The present invention relates to storable water-clear bright-drying emulsions containing waxes.

Bright-drying emulsions for the care of floor coverings, in particular those which are sensitive to solvents, have been known in the art and have frequently been described in literature. They are generally composed of the following components:

from 0.0 to 100.0% by weight of ionogenic or non-ionogenic emulsions of partially synthetic ester waxes (for example, montan wax derivatives), natural waxes (for example, candelilla wax, carnauba wax, beeswax), synthetic waxes (for example, polyethylene waxes, microcrystalline waxes, synthetic paraffin oxydates), the said emulsions containing from 15 to 20% by weight of solid matter;

from 0.0 to 95.0% by weight of polymer dispersions (for example, dispersions of polyethylene, polyvinyl acetate, polystyrene, polyacrylate, polymethacrylate, styrene-acrylate- and styrene-methacrylate-copolymers);

from 0.0 to 30.0% by weight of alkali-soluble resins (for example, colophonium-maleinate resin, shellack, styrene-maleinate resin, polyester resin);

from 0.0 to 5.0% by weight of additives (for example, film-forming auxiliaries, temporary and permanent plasticizers, antistatic agents, corrosion inhibitors, substances having a bactericide effect, means of preservation, dyestuffs, and possibly metal salts as reversible cross-linking agents).

By the various possibilities to vary the components and their proportions to one another, the properties with regard to the application of the films, which are obtained from those emulsions, can easily be adapted to the special desires of the consumer. Thus, for example, it is possible to adjust, according to one's desire, the bright-drying capacity, the water-resistance, the resistance to treading, the dirt absorption, the resistance to solvents and alkaline detergents, and the capability of being polished. High polymer proportions give particularly mechanically resistant, high-gloss films, which lack, however, the capability of being repolished or after-polished. This means, however, that the surfaces of the films, which have been damaged by practical use, cannot be repaired any more by a simple polishing process, but only by way of removing the old film and by applying a new one, which is considered a disadvantage. Most of the bright-drying emulsions therefor contain a wax proportion which is more or less high. With an increasing wax content, the capability of being polished is also increased: whereas the films consisting of bright-drying emulsions having up to 30% by weight of wax emulsion (content of solid matter about 15 to 20% by weight) are hardly polishable, and those having from 30 to 40% by weight of wax emulsion can be polished only with difficulty, films of bright-drying emulsions containing 50% by weight of wax emulsion or more can be polished easily.

Whereas the above-mentioned bright-drying emulsions have a milky-white or strongly opalescent appearance, bright-drying emulsions have become known in recent times, which are completely water-clear (cf. German Offenlegungsschriften Nos. 1,811,012 and 1,811,247, as well as the magazine "Soap and Chemical Specialities," February 1969, page 41). These bright-drying emulsions also provide clear films, which have advantageously well-balanced properties with respect to high gloss, resistance to detergents, repeated application, resistance to abrasion, hardness of film and removability, but which can only be after-polished in an unsatisfactory way.

The special properties of these emulsions are obtained by using copolymer dispersions with an addition of metal salts. The admixture of up to 70% by weight of wax emulsions in order to obtain after-polishing properties is said not to affect the above-mentioned favorable properties.

It has now become evident that the admixture of emulsions of the known waxes, which have been described in the cited publications as being suitable, indeed effects the desired capability of being after-polished of the floor caring films, but that there is the disadvantage that, owing to the opaque appearance of the added wax emulsion, the floor caring emulsions also take on a more or less opaque appearance. It has, in fact, been achieved to obtain wax emulsions that are clear at first, with some determined waxes by means of adding a high amount of an emulsifying agent, or with special waxes having a high acid number, for example, an ester wax on a montan wax basis having an acid number of about 80; however, if these substances are stored at normal or slightly elevated temperature (50 to 60° C.), a turbidity is formed more or less fast, which precipitates to form a deposit. When these wax emulsions are mixed with the water-clear polymer dispersions, the turbidity effect becomes evident in particular. The precipitating particles very badly affect the appearance and the film properties of the floor caring substances, especially, if a greater amount of wax emulsion is admixed.

It has now been found that water-clear aqueous emulsions can be prepared on the basis of determined waxlike polyethylene glycol esters of higher carboxylic acids, which emulsions do not lose their transparency and do not show any signs of flocculation, even if stored for a long time at room temperature or at elevated temperature. They are thus extremely suitable as wax component in aqueous bright-drying emulsions, both individually and in admixture with the above-mentioned water-clear polymer dispersions.

The present invention provides a water-clear storable aqueous bright-drying emulsion consisting of a wax emulsion and a water-clear polymer dispersion, as well as, optionally, further additives, which wax emulsion is an aqueous emulsion of a waxlike ester of a straight-chain or branched aliphatic monocarboxylic acid having from 16 to 36 carbon atoms and of a polyethylene glycol having a molar weight of from 5,000 to 20,000, the emulsion containing from 15 to 20% by weight of solid matter.

The present invention also provides a process for the preparation of a water-clear storable aqueous bright-drying emulsion by mixing a water-clear polymer dispersion with a wax emulsion, in which process further additives may, optionally, be added, which comprises using as wax emulsion an aqueous emulsion of a waxlike ester of a straight-chain or branched aliphatic monocarboxylic acid having from 16 to 36 carbon atoms and of a polyethylene glycol having a molar weight of from 5,000 to 20,000, the wax emulsion containing from 15 to 20% by weight of solid matter.

The waxes used in accordance with the invention are prepared according to known methods. As acid component, there may be used straight-chain or branched aliphatic fatty acids having from 16 to 36, preferably from 18 to 32 carbon atoms, for example, palmitic acid or stearic acid or their technical mixtures, in addition, carboxylic acids and/or carboxylic acid mixtures, as they can be obtained, for example, by the oxydation of straight-chain paraffins, microcrystalline waxes or polyethylene waxes having an average molecular weight of from 1,000 to 10,000 with, for example, gases containing oxygen. Particularly suitable are montan acids, which are obtained by a treatment of possibly deresinified crude montan wax with chromium sulfuric acid. Mixtures of the carboxylic acids may also be used, for example, co-oxydates of montan wax and polyethylene wax.

The waxes to be used according to the invention are obtained on the basis of the above-mentioned acids either by esterification with polyethylene glycols having an average molecular weight of from 5,000 to 20,000, preferably from 10,000 to 15,000, which can be prepared by way of polymerization of ethylene oxide, or by the addition of the corresponding amount of ethylene oxide. If the waxes are to be prepared by esterification, from 0.75 to 1.1 equivalent of polyethylene glycol is generally used for 1 equivalent of carboxylic acid, and the esterification is stopped, after the desired acid number has been reached, by neutralizing the esterification catalyst. Products having an acid number of less than 60, in particular those which have an acid number in the range of from about 2 to 20, have particularly advantageous properties with regard to their application.

If the waxes to be used according to the invention are to be prepared directly from the acid and ethylene oxide, 1 equivalent each of the carboxylic acid is reacted with from 45 to 350, preferably from 60 to 170 moles of ethylene oxide at a temperature of about 100 to 200° C. in the presence of catalysts having an alkaline reaction.

The waxes obtained according to either method can be emulsified in known manner in accordance with the wax-into-water or the water-into-wax method, optionally, while adding a small amount of organic bases, such as morpholine, N,N-diethyl-amino-ethanol, 2-amino-2-methyl-propanol-(1), ethylamine or ammonia, which serves for the neutralization, to give completely water-clear storable emulsions which have a solid content of about up to 20% by weight.

The wax emulsions obtained are already suitable individually as bright-drying floor caring substances, however, they serve mainly as additives to the known transparent polymer dispersions, improving the polishing properties, but not badly affecting the transparency, the dispersions possibly containing further additives common for floor caring emulsions, for example, alkali-soluble resins, such as colophonium- or styrene-maleinate resins, film-forming auxiliaries, such as fluorinated carboxylic acids, plasticizers, such as dibutylphthalate, dibutoxy-ethyl phosphate, glycol ether or ethylene glycol, in addition, anti-static agents, corrosion inhibitors, means of preservation, bactericide substances, dyestuffs and metal salts, such as carboxylic acid aluminum, zirconium, magnesium, and, in particular, zinc, preferably zinc acetate.

Besides this field of application, the water-clear wax emulsions may also advantageously be used in every place, where the clear form of application or the clear wax film is desired.

The parts specified in the following examples and comparative examples are parts by weight. Examples A to D describe the preparation of the waxes used in accordance with the invention, whereas Examples 1 to 3 describe the preparation of the bright-drying emulsions of the invention. The following examples serve to illustrate the invention.

EXAMPLE A 665.0 g. of a montan acid having an acid number of 127, which had been obtained by oxydative bleaching of deresinified crude montan wax, was esterified, in the presence of 5 ml. of 20% sulfuric acid at a temperature of 140° C. with 4950.0 g. of polyethylene glycol having an average molecular weight of 7500 for such a time, until the acid number of the reaction mixture was less than 15. Subsequently the catalyst was neutralized with the corresponding amount of alcoholic potash lye. The hard light wax obtained had an acid number of 15 and a flow point/drop point according to Ubbelohde of 75° C.

EXAMPLE B

Analogus to Example A, 663.0 g. of montan acid having an acid number of 127 were esterified with 6000.0 g. of polyglycol having an average molecular weight of 10,000. As soon as the acid number of the esterification mixture was less than 13, the reaction was stopped by neutralizing the catalyst. A very light wax having an acid number of 13 and a flow point/drop point of 64° C. was obtained.

EXAMPLE C

Analogous to Example A, 42.0 g., of stearic acid were esterified with 495.0 g. of polyglycol having an average molecular weight of 7,500. After the acid number had dropped to below 18, the reaction was stopped. The light wax obtained had an acid number of 17 and a flow point/drop point of 58° C.

EXAMPLE D 5.2 g. of potassium hydroxide were added to 430.0 g. of a montan wax acid (acid number 130) which had been obtained by oxydative bleaching of deresinified crude montan wax with chromium sulfuric acid, and the reaction mixture was heated at 150° C. under a nitrogen atmosphere. As soon as the neutralization water had been removed, ethylene oxide was introduced for such a time, until 3741.0 g., which corresponded to 85 moles of ethylene oxide, had been absorbed. After the reaction mixture had been blown out with nitrogen, a light wax was obtained, which had the following indices:

acid number: below 2
saponification number: 285
flow point/drop point according to Ubbelohde: from 60.8 to 61.2° C.

EXAMPLE 1

15 parts of the wax obtained according to Example B were melted at 105° C. The hot melt was reacted, while stirring, with 1.0 part of N,N - diethyl - amino - ethanol, which had been pre-heated to a temperature of 45° C. The wax melt was then passed into 84.0 parts of boiling water, while stirring constantly. The emulsion obtained was rapidly cooled to room temperature. 100 parts of a water-clear wax emulsion were obtained. The table given below shows the excellent stability of the transparency during storage.

EXAMPLE 2

20.0 parts of the water-clear wax emulsion described in Example 1 were mixed with 80.0 parts of a water-clear, metal salt-containing copolymer dispersion (Rhoplex® B 505; manufacturing company: Rohm and Haas, Philadelphia, U.S.A.), which had been obtained by stirring 20 parts of concentrated ammonia into 100.0 parts of the dispersion, and which had been diluted with water to a solids content of 15%, with 10.0 parts of a 15% ammoniacal solution of a styrene-maleinate resin (Sinclair® 2625a; manufacturer: Sinclair Inc., New York), as well as with 4.0 parts of dipropylene-glycol-monomethyl-ether and 0.4 part of dibutoxethyl phosphate at room temperature in the said order, while stirring vigorously. A bright-drying emulsion having very good stability properties was obtained (cf. table given below).

EXAMPLE 3

15.0 parts of the wax obtained in accordance with Example D were emulsified, according to the method described in Example 1, with 1 part of N,N-diethyl-aminoethanol in water. 10.0 parts of the water-clear wax emulsion thus obtained were mixed with 90.0 parts of a metal salt-containing transparent copolymer dispersion having a solids content of 15% (prepared according to Example 2) and 10.0 parts of a 15% ammoniacal solution of a styrene-maleinate resin, as well as with 4.0 parts of dipropylene-glycol-monomethyl ether and 0.4 parts of dibutoxethyl phosphate at room temperature. The stability of the water-clear bright-drying emulsion obtained can be seen from the table given below.

The following Comparative Examples 1 to 5 indicate the stability values of water-clear copolymer dispersions and those of known wax emulsions, as a comparison standard for the stability test of the waxes used in accordance with the invention and their mixtures with the water-clear copolymer dispersions.

COMPARATIVE EXAMPLE 1

100.0 parts of the water-clear, metal salt-containing copolymer dispersion cleared up with ammonia, which had been described in Example 2, were subjected to storage at a temperature of 20° C. The dispersion shows excellent stability values.

COMPARATIVE EXAMPLE 2

14.0 parts of an ester wax on the basis of montan wax having the acid number of 80 (Hoechst-Wachs® U) were melted together with 1.0 part of non-ionogenic emulsifier (fat alcohol polyethylene oxide ether with 25 moles of ethylene oxide) at a temperature of from 115 to 120° C. A mixture consisting of 2.2 parts of diethyl-amino-ethanol and 0.5 part of methyl diglycol, which had been pre-heated to 45° C., was stirred into the hot melt. The wax-emulsifier mixture thus obtained was introduced in a hot state into boiling water, while stirring constantly. The emulsion was rapidly cooled to room temperature. 100.0 parts of a bright-drying emulsion, which was water-clear at first, were obtained, however, which became turbid after having been stored for a rather long time (cf. table given below).

COMPARATIVE EXAMPLE 3

5.0 parts of wax emulsion according to Comparative Example 2 were mixed, in the manner described above, with 95.0 parts of the 15% water-clear, metal salt-containing copolymer dispersion prepared and cleared up in accordance with Example 2, 10.0 parts of a 15% styrene-maleinate resin solution, 4.0 parts of dipropylene-glycol-monomethyl ether, and 0.4 part of tributoxethyl phosphate, at room temperature. The emulsion was, in fact, still water-clear immediately after its preparation, however, it was completely turbid already after one week of storage.

COMPARATIVE EXAMPLE 4

16.0 parts of an oxygenated polyethylene wax having the acid number of 15 were melted together with 3.2 parts of oleic acid at a temperature of 125° C. The hot melt was reacted with 3.2 parts of morpholine heated to 60° C. and was then stirred in a hot state into 77.6 parts of hot water. A water-clear wax emulsion was obtained, which became turbid during storage.

COMPARATIVE EXAMPLE 5

5.0 parts of a polyethylene wax emulsion according to Comparative Example 4 were mixed, in the manner described in Comparative Example 3, with the water-clear polymer dispersion prepared according to Example 2, styrene-maleinate resin, dipropylene-glycol-monomethyl ether and dibutoxethyl phosphate. The bright-drying emulsion, which had been water-clear at first, was completely turbid after one week of storage.

In the table given below, the measure for the turbidity of the wax and/or bright-drying emulsions of Examples 1 to 3 of the invention and of the Comparative Examples 1 to 5 was the light transmitting quality after a determined period of storage.

It was measured against water with a light wave length of 533 nm. and a thickness of the layer of 1.00 cm. at a temperature of 20° C., by means of the spectrophotometer Elko II of Firm Zeiss.

| Test | Light transmitting quality (percent) | | | |
|---|---|---|---|---|
| | After 1 day | After 1 week | After 2 weeks | After 4 weeks |
| Example: | | | | |
| 1 | 84.0 | 86.8 | 85.0 | 82.2 |
| 2 | 94.0 | 93.6 | 92.1 | 91.2 |
| 3 | 93.6 | 90.8 | 79.3 | 62.2 |
| Comparative example: | | | | |
| 1 | 93.0 | 96.1 | 96.3 | 74.2 |
| 2 | 59.0 | 46.4 | 32.0 | 18.7 |
| 3 | 87.2 | 3.0 | | |
| 4 | 40.1 | 33.1 | 28.7 | 16.2 |
| 5 | 88.0 | 3.0 | | |

What is claimed is:

1. A water-clear, storable aqueous bright-drying emulsion consisting of a wax emulsion and of a water-clear polymer dispersion, as well as, optionally, of further additives, wherein the wax emlusion is an aqueous emulsion of a waxlike ester obtained by reacting 1 mole earth of a straight-chain or branched aliphatic monocarboxylic acid having from 16 to 36 carbon atoms either with from 0.75 to 1.1 mole of a polyethylene glycol having a molar weight of from 5,000 to 20,000, or with from 45 to 350 moles of ethylene oxide, the wax emulsion containing from 15 to 20% by weight of solid matter.

2. A bright-drying emulsion as claimed in claim 1, which contains as further additives one or several members selected from the group consisting of alkali-soluble resins, film-forming auxiliaries, plasticizers, antistatic agents, corrosion inhibitors, means of preservation, bactericidal substances, dyestuffs, and metal salts.

3. A bright-drying emulsion as claimed in claim 1, wherein the polyethylene-glycol ester has an acid number of less than 60.

4. A process for the preparation of a water-clear storable aqueous bright-drying emulsion by mixing a water-clear polymer dispersion with a wax emulsion, in which process there may be used, optionally, further additives, wherein as wax emulsion there is used an aqueous emulsion of a waxlike ester obtained by reacting respectively 1 mole of a straight-chain or branched aliphatic monocarboxylic acid having from 16 to 36 carbon atoms either with 0.75 to 1.1 mole of a polyethylene glycol having a molecular weight of from 5,000 to 20,000 or with 45 to 350 moles of ethylene oxide, the wax emulsion containing from 15 to 20% by weight of solid matter.

5. A process as claimed in claim 4, wherein as further additives there are used one or several members selected from the group consisting of alkali-soluble resins, film-forming auxiliaries, plasticizers, antistatic agents, corrosion inhibitors, means of preservation, bactericidal substances, dyestuffs and metal salts.

References Cited

UNITED STATES PATENTS

| | | | |
|---|---|---|---|
| 3,062,671 | 11/1962 | Kaupp et al. | 106—270 |
| 3,328,325 | 6/1967 | Zdanowski | 260—28.5 R |
| 3,352,805 | 11/1967 | Lima | 260—28.5 R |
| 3,071,604 | 1/1963 | Mohan | 260—410.6 |

MORRIS LIEBMAN, Primary Examiner

S. L. FOX, Assistant Examiner

U.S. Cl. X.R.

106—210; 260—29.6 XA